United States Patent
Smith (10) Patent No.: US 9,313,069 B2
(45) Date of Patent: Apr. 12, 2016

(54) OFDM PROCESSING SYSTEM AND METHOD

(71) Applicant: Neil Edgar Smith, Highland Park, IL (US)

(72) Inventor: Neil Edgar Smith, Highland Park, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 162 days.

(21) Appl. No.: 14/337,981

(22) Filed: Jul. 22, 2014

(65) Prior Publication Data

US 2016/0028575 A1     Jan. 28, 2016

(51) Int. Cl.
*H04L 27/26* (2006.01)

(52) U.S. Cl.
CPC ........ *H04L 27/2628* (2013.01); *H04L 27/2613* (2013.01)

(58) Field of Classification Search
None
See application file for complete search history.

(56) References Cited

U.S. PATENT DOCUMENTS

| | | | | |
|---|---|---|---|---|
| 6,912,194 B1* | 6/2005 | Marchok | ................ | H04L 5/023 370/208 |
| 2004/0160894 A1* | 8/2004 | Lee | ....................... | G06F 17/142 370/210 |
| 2005/0177608 A1* | 8/2005 | Lee | ....................... | H04L 27/265 708/404 |

\* cited by examiner

*Primary Examiner* — Hong Cho (57) ABSTRACT

A method and system for processing an Orthogonal Frequency Division Multiplexed (OFDM) signal. The system includes a signal source configured to provide a sequence of ordered data values and a corresponding sequence of ordered addresses. A plurality of processors includes a first processor and a last processor, wherein the first processor is coupled to the signal source. Each processor is configured to pass the data values without modification and modify the addresses of the corresponding data values. The system further includes a memory coupled to the last processor. The memory is configured to store each data value from the last processor at a corresponding modified address of the memory provided by the last processor.

20 Claims, 6 Drawing Sheets

OFDM PROCESSING SYSTEM AND METHOD

BACKGROUND

Orthogonal frequency-division multiplexing (OFDM) is a method of encoding digital data on multiple carrier frequencies. In recent years, OFDM has developed into an increasingly popular scheme for digital communication, for both wireless and wired communications. OFDM modulation may use an Inverse Fast Fourier Transform (IFFT) as a way for generating the multiple carrier waveform. The IFFT operation is typically performed as a single, monolithic operation, resulting in what is frequently referred to as OFDM symbols. An OFDM symbol comprises an RF signal time slice that represents an integer number of bits. In a transmission context, a symbol is placed on a transmission channel at one or more predetermined symbol rates, and the receiving device detects the sequence of symbols on the channel in order to reconstruct the transmitted data. OFDM data symbols are converted by an FFT in a receiver into a plurality of frequency bins or carriers of a given bandwidth, together representing a transmission symbol. Many processing operations are constrained by the data set size of a symbol Over time, OFDM methods have been using an ever increasing (I)FFT symbol size. As the symbol size increases, memory requirements for the (I)FFT and various pre-processing steps have increased proportionally, making, for example, field-programmable gate arrays (FPGAs) or very large scale integration (VLSI) chips such as application specific integrated circuits (ASICs) that are used in the process more complicated and costly. The increase in cost is related to many factors, one of which is an increase in the physical chip area that is required to implement a processing function and to accommodate the additional memory used in the processing function. Memory occupies significant portions of the physical area of such chips, as a result of which memory is a significant factor in chip cost. The added memory also adds to an increase in power consumption, which impacts not only power supply design considerations but also cooling requirements.

In the known system, a minimum amount of memory (e.g., random access memory (RAM)) is required to perform each processing function of the multiple processing functions performed in an OFDM transmitter, as well as to perform the corresponding inverse processing functions in an OFDM receiver. Typically, each processing operation is designed and performed independently (e.g., at the most local level) of other processing functions with the output of the processing operation being data that is the result of the completed function. To accomplish the independent operation of the processes, each processing operation includes its own memory block that is used to perform its configured function. As the number of processing steps (e.g., blocks) in the system increases, the total amount of memory required for the system increases linearly because each processing step stores its data in its own memory space. Known methods implement and complete each processing operation independently, thereby reducing the design complexity for the system but resulting in each processing step requiring its own memory.

Figure 1:
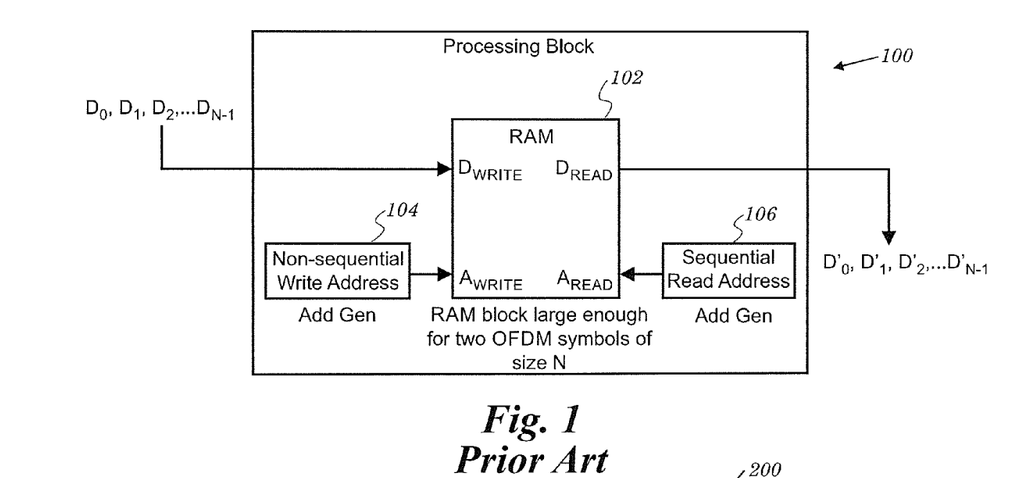
FIG. 1 illustrates a prior art processing block.

FIG. 1 illustrates a generic prior art processing block 100, which may be used in the context of a system that includes a number of such processing blocks connected in series. Each processing block 100 receives data at an input, performs its respective function on the incoming data, and outputs data that has been modified according to the function. The output data may be provided to a further processing block or to another element of the system. In an example of the prior art processing block, the incoming data includes a string of data values that are each assigned an address. The addresses are used to write the data values into corresponding address spaces in a memory 102. The addresses assigned to the data values are not in sequential order but instead are non-sequential addresses according to the function to be performed by the processor block 100. The addresses may be referred to as non-sequential write addresses. The data (e.g., $D_0$, $D_1$, $D_2$, ... $D_{N-1}$) is written into the memory 102 using the non-sequential write addresses. As a result, the data values are stored in the memory 102 in a non-sequential order. The stored data values are then read from the memory 102 using sequential read addresses to obtain the data values in the order in which they are stored in the memory. As a result, the data values which have been output from the memory 102 in this way are formatted as if the function of the processing block 100 has been performed directly on the data. The resulting processed data is output from the processing block 100.

In a particular example, the processing operation for the processing block 100 is accomplished by modifying the data, e.g., including but not limited to reordering the data values as they are stored into the memory 102 according to the addresses generated by a non-sequential address generator 104 that is internal to the processing block 100. After the data has been stored in the memory 102 as reordered or otherwise modified data, it is read from memory 102 according to a sequential address signal generated by a sequential read address generator 106 that is internal to processing block 100. The data is manipulated as it is written into memory 102 and the thus manipulated data is read out of the memory in the modified order or form. It will be understood that the particular manipulation of the data is based on the required function to be performed.

Figure 2:
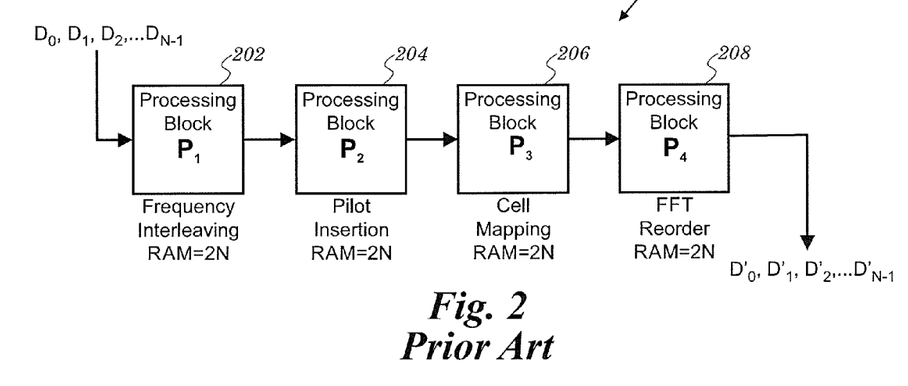
FIG. 2 illustrates a plurality of prior art processing blocks coupled in series, where each processing block has its own memory.

The processing blocks are typically designed as stand-alone processes by the circuit designers. Each is considered a black box from a design standpoint so that processing block may be added to a system independently of other system elements. FIG. 2 illustrates a plurality of processing blocks 202, 204, 206 and 208 coupled in series, where each processing block receives data, applies addresses to the data values, writes the data values into a memory according to the write addresses, reads the stored data from the memory according to read addresses, and outputs processed data. Thus each processing block 202-208 has its own memory to perform its function. The processing blocks 202-208 receive at their inputs only the data string of data values and output at their outputs only the data string of data values modified according to the respective function. For purposes of this discussion, it will be assumed that each processing block (e.g., 202, 204, 206, and 208) has a configuration similar to that of processing block 100 of FIG. 1.

Each processing block may perform a different function, such as frequency interleaving (e.g., processing block 202), pilot insertion (e.g., processing block 204), cell mapping (e.g., processing block 206) and FFT reordering (e.g., processing block 208). Since each block is independent of other blocks, the memory (e.g., random access memory (RAM)) requirement of the system 200 scales with the number of processing blocks. For example, for an FFT of size N, each processing block requires RAM of size N symbols. For N=32768 and 32 bit symbols, each RAM must be 32768×32 bits=1 Mbit. For four processing stages the system requires 4Mb of RAM.

Each memory block occupies a significant area on the semiconductor material of a processing chip and uses a significant portion of the power required by the chip. The cost of the processing chip depends to a great extent on the area occupied by the circuit elements. As memory requirements increase, the size, cost, and power requirements increase, which also increases the heat dissipation requirements. Combining some or all of the processing blocks into a single chip requires that significant areas of the chip are dedicated to the memory for the respective processing blocks, with a corresponding higher cost, higher power usage, and higher heat generation.

Since the data is manipulated by each processing block, each processing block includes its own memory, thereby requiring a linearly increasing amount of memory with each processing block. Accordingly, it would be beneficial to have a system and method that reduces the overall implementation cost, power consumption, complexity, and chip real estate of prior art signal processing systems

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein generally relate to signal processing, and more particularly, to Orthogonal Frequency Division Multiplexed (OFDM) signal processing. Instead of each processing block manipulating the data stored in a memory according to internally generated address signals and outputting the manipulated data, each processing block allows data to pass through the processing block unchanged or substantially unchanged. Address information by which the data may be written into a memory or read from a memory and which has been modified to implement the process of each block is output from the blocks along with the data. The modified addresses are passed along to the next processing block in the series along with the data. Each processing block applies its address changes to the modified address string it receives from the preceding processing block. The address changes are cumulative as the address information is passed through each processing block so that at the completion of the sequence of processing blocks the address changes provide an aggregate address information to perform the functions of each of the processing blocks simultaneously as the data is written into memory using the aggregate address information.

Since the data is not manipulated by each processing block, data storage (e.g., RAM) for storing the data is not required for each processing block. Instead, a single memory block may be used at the completion of the processing sequence in which to write the data received from the final processing block with the aggregate address information. Only a single memory block is used, even in systems that include multiple process steps, thereby significantly reducing the memory required for processing the OFDM signal or other signals. The substantial reduction in memory in turn reduces the overall implementation cost, power consumption, complexity, and chip real estate of the system.

Processing operations performed by the processing blocks may include frequency interleaving, pilot insertion, cell mapping, Fast Fourier Transform (FFT) ordering, etc. These operations are well known in the art and will therefore not be discussed in detail for brevity. In the context of OFDM symbol processing, the processing operations (e.g., functions) can be interpreted as having a common aspect; in particular, the location of the data within the finite field of a symbol is altered. Since each successive processing block operates on the same finite-field, the address manipulations (e.g., for each function) may be aggregated independently of the data. Accordingly, each processing operation does not require a memory buffer. Put differently, since all functions are implemented in aggregate fashion, the RAM operations may be summed before being applied to the RAM. Any operation (e.g., interleaving, reordering, insertion, etc.,) will not require use of a memory (e.g., RAM) prior to applying a further processing function. Instead, a single RAM block, at the output of the last processing block, is sufficient to receive the data according to the aggregate function of the processing operations.

For example, each data value within a symbol ($D_0$-$D_{N-1}$) has corresponding address information ($A_0$-$A_{N-1}$). The address information may be provided by an address generator that precedes the first processing block in the series or the address generator may be included in the first processing block. Subsequent processing blocks do not require an address generator for generating write addresses nor do they require an address generator for generating read addresses, since the address information that will be used by the second block and by subsequent blocks is received from the respective preceding processing block. The order of the data values is maintained through each processing block. The data may pass through the processing blocks without modification or the data may be changed in a way unrelated to the RAM operations of the processing block. For example, an amplifier function may increase the magnitude of the data signals without changing the order of the data values. In one embodiment, the address information for each data value is manipulated by each processing block so that when the data is written into a memory using the manipulated address information and then read sequentially from the memory; it has the effect of having performed the function on the data by rearranging the data.

In some embodiments, the manipulated addresses may be used to read stored data from a memory to perform one or more processing functions. The address manipulations of each processing block are passed to a next processing block for further manipulation and the accumulated manipulations are used to read the data from the memory so that the aggregated functions of the processing blocks are performed on the data as it is read from the memory. The use of manipulated addresses to read data from the memory to perform the function(s) may be used alone or in conjunction with manipulated addresses to write data into the memory to perform further functions.

In one example, a data interleaver function at a transmitter may be performed by manipulating the address information such that when the data values are written into memory or read from the memory using the corresponding addresses, the data is re-ordered to reflect the desired interleave. A similar process may be performed for a de-interleaver at a receiver end to return returning the data values to their original positions.

Other processes, such as pilot signal insertion, cell mapping, FFT reordering or other processes may be performed using the address manipulation without acting on the data itself. Each of these processes may be performed at the transmitter end and the inverse of the processes performed at the receiver end of a data transmission system. The data symbols are allowed to pass through each processing block without any modification, or with a modification other than re-ordering of the data values. The data is ultimately stored in a memory location based on the aggregate modified address information provided by the last processing block after each preceding block has added its address manipulation to the address information. The manipulated address information is processed in sequence according to certain embodiments.

It is also contemplated that a single address manipulation may be performed that is equivalent to the end result of a sequential address manipulation of two or more process blocks. The single address manipulation is as if the aggregate address change had been performed on the addresses, to effectively perform the functions of two or more function blocks in a single address manipulation.

Figures 3, 4A:
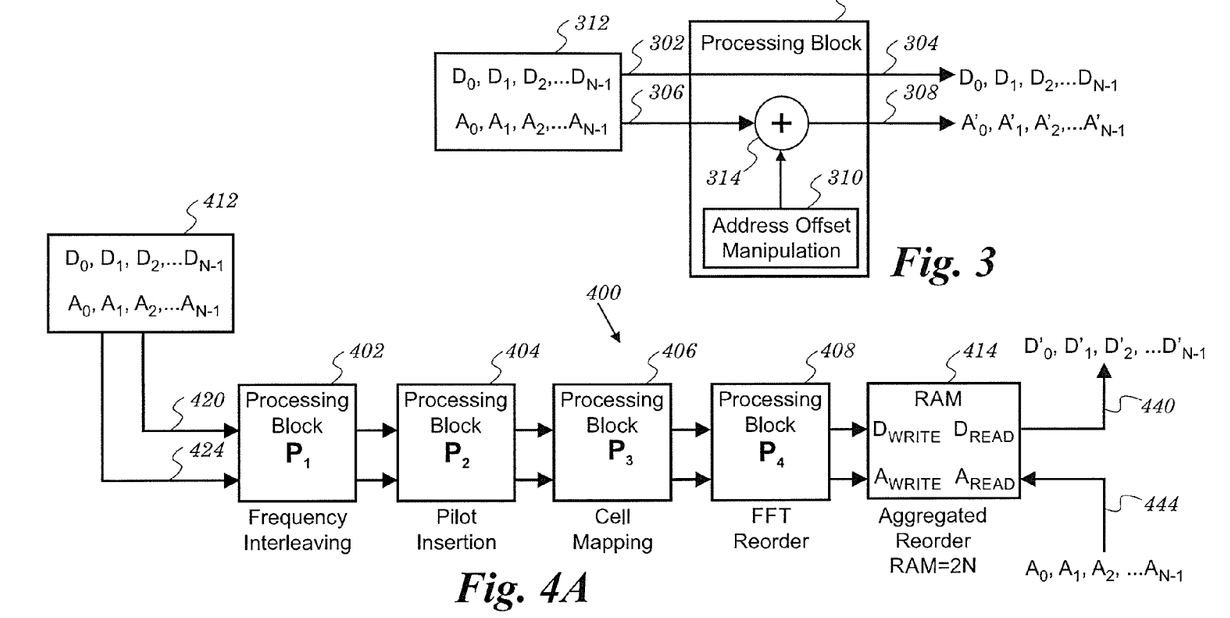
FIG. 3 illustrates a processing block consistent with an exemplary embodiment of the invention.
FIG. 4A illustrates a processing system that includes a plurality of processing blocks, consistent with an exemplary embodiment of the invention.

Reference now is made to FIG. 3, which illustrates an exemplary processing block without a dedicated memory. In one embodiment, processing block 300 has a data input node 302 and a data output node 304. Processing block 300 further includes an address input node 306 and an address output node 308. The addresses may be assigned by an external device or may be provided by the processing block, in which case an address input is not required. Each data input (e.g., $D_0$, $D_1, D_2, \ldots D_{N-1}$) provided by the signal source 312 has or is assigned a corresponding address (e.g., $A_0, A_1, A_2, \ldots A_{N-1}$). The processing block 300 is configured to pass the data symbols from the input node 302 to the output node 304 without any modification and in particular without modification of the sequence. It is also possible that other functions could be performed on the data symbols so that the data symbols are modified by the other functions but are passed without modification of the sequence of the values for the processing function of the processing block. The processing block 300 is further configured to modify the address or addresses of each data value according to the function of the processing block. The address change is based on a determination of an address manipulation that has the effect of having performed the process on the data when data is written into the manipulated address space and then read sequentially or in stored order from the memory. Thus, instead of applying the address manipulation to the RAM, it is applied to an address pointer. The address change is performed by an address offset manipulation unit 310 and an element 314, where element 314 performs an addition function modulo-N to keep the address values within the finite field of the symbol.

The change in the address information is based on the function that is intended to be performed and may differ for each process. For example, an address information change to implement interleaving of data is different from pilot insertion where a known pilot signal is inserted into the data at predetermined locations, or cell mapping or other functions. There may be a plurality of processing blocks coupled in series, each configured to perform a different function, as discussed below.

FIG. 4A illustrates an exemplary embodiment of a processing system 400 that includes a plurality of processing blocks (e.g., processors 402, 404, 406, and 408). The processing blocks (e.g., 402 to 408) do not include a dedicated memory into which to write and store the data. In one embodiment, the processing blocks are coupled in series. While four processing blocks have been illustrated by way of example, it will be understood that the number of blocks may vary depending on different implementations and may be greater or fewer. The first processing block 402 is coupled to the signal source 412 that provides the data values via its input node 420. Each data value has corresponding address information that is provided by the signal source 412 to the address input 424 of the first processing block 402. As illustrated in FIG. 3, the data symbols are passed through processor 402 unmodified and the address signals are modified according to a manipulation determined by the function performed and output in a reordered sequence. Each of the processors 404, 406, and 408 operates in a like manner in response to the data and address signal from the previous processor. For example, the processing blocks (e.g., 402, 404, 406, and 408) may be configured to provide the functions of frequency interleaving, pilot insertion, cell mapping, FFT reorder, etc.

The last processing block 408 is coupled to a memory 414. While a random access memory (RAM) is illustrated, it will be understood that any known volatile or non-volatile memory may be used. Examples of the memory 414 types also include (but are not limited to) SRAM (static RAM), DRAM (dynamic RAM), PCRAM (phase change RAM), CBRAM (conductive bridging), and MRAM (magnetoresistive memory), etc. The memory 414 is coupled to the last processing block 408 in the sequence and therefore receives the aggregate changed address information accumulated by the actions of the different processing blocks (e.g., 402 to 408) as well as the corresponding data that has not been modified by any processing block. The memory 414 is configured to store each data symbol received from the last processing block 408 at a corresponding address of the memory provided by the last processing block 408. The stored data is then read out of memory 414 in response to the sequential address signals supplied on input 444. The data read from memory 414 is re-ordered so as to reflect the processing by the functions of processors 402 to 408.

In one example, the initial input address information provided by the signal source 412 is sequential (e.g., $A_0, A_1, A_2$, etc.) and presented to the processing block (e.g., 402) synchronously with its data value. The output of each block, including the modified address information, is provided to the next processing block. As the address information is transferred from block to block, the address information is modified in aggregate by each sequential processing block to implement the function(s) desired. At the end of the sequence of processing blocks, the data value is written directly into the memory 414 at the memory locations identified in the aggregately compounded address information (i.e., provided by the last stage of the series of processing blocks). In one embodiment, the rearranged data values resulting from the modified address information are read out of the memory in sequential order so that the rearranged order is maintained in the output data.

The data can be read out from an output 440 of the memory 414 using the initial sequential address (e.g., $A_0, A_1, A_2$, etc.). For example, if N=1Mb symbol size, the system 400 would use 2N=2 mB RAM to implement IFFT pre-processing. Accordingly, the address modification discussed herein reduces the memory requirements to a minimum value possible for a given symbol size.

Figure 4B:
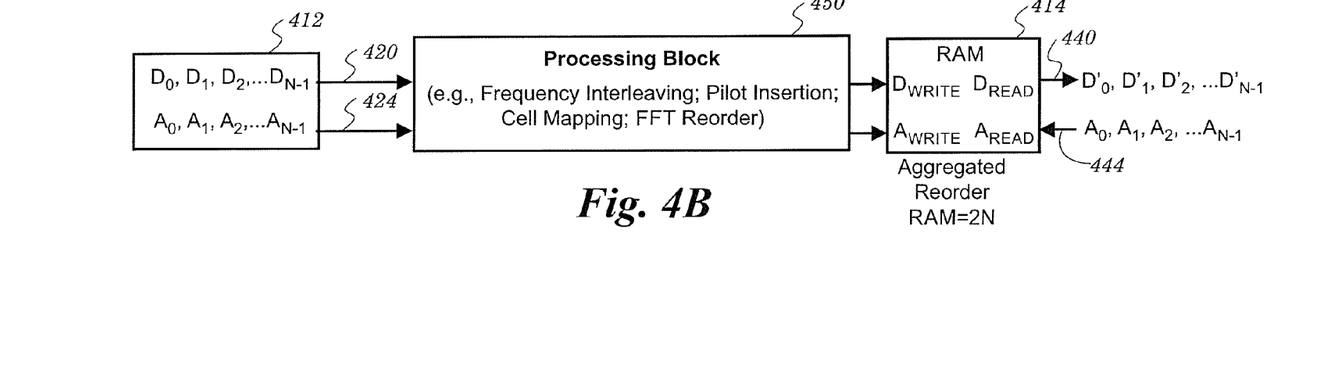
FIG. 4B illustrates a processing system that includes a single processing block, consistent with an exemplary embodiment of the invention.

FIG. 4B illustrates an exemplary embodiment of a processing system 400 that includes a single processing block 450. Put differently, the processing block 450 combines all the functions (e.g., the functions of processors 402, 404, 406, and 408) in a single block. Thus, instead of performing individual manipulations to the address information that has the effect of, for example, frequency interleaving, pilot insertion, cell mapping, FFT reordering, etc., in series, the address information is modified by the single processing block 450 to a form as if the address information had passed through the series of processing blocks. By writing the data into the memory using the address information, the act of sequentially reading the data has the effect of performing all the functions. The data symbols are allowed to pass through the processing block 450 to the memory 414 without modification. It will be understood that processing block 450 includes an address manipulation arrangement similar to that shown in FIG. 3 (i.e., element 310).

Figures 5, 6:
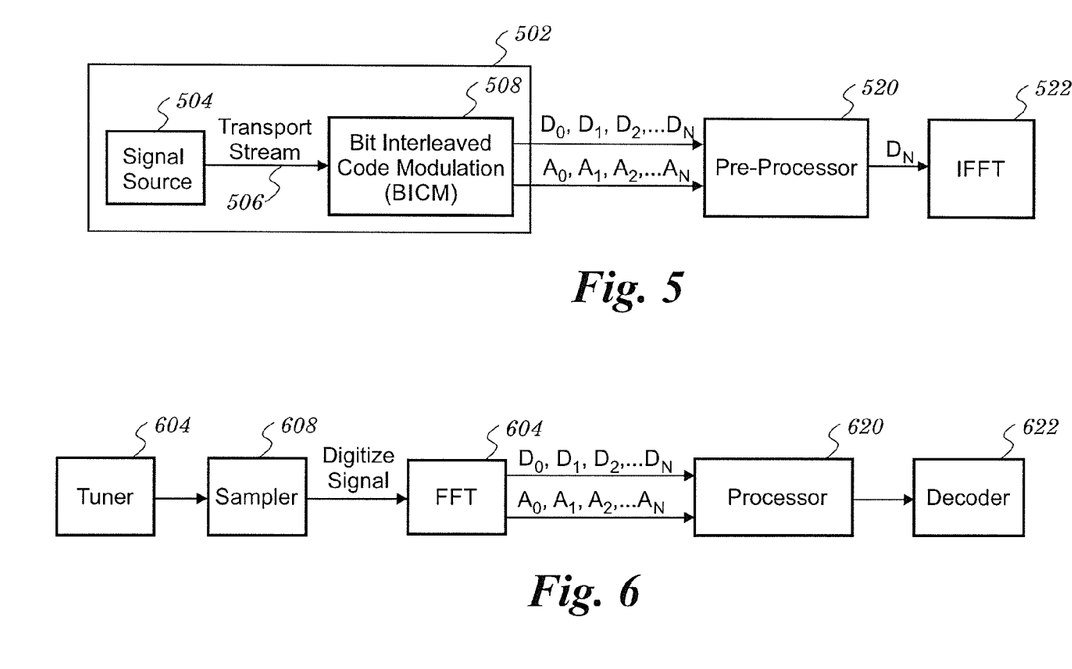
FIG. 5 illustrates a processor used in the context of a transmitter, consistent with an exemplary embodiment of the invention.
FIG. 6 illustrates a processor used in the context of a receiver, consistent with an exemplary embodiment of the invention.

FIGS. 5 and 6 illustrate exemplary embodiments of different environments in which the processing blocks, collectively referred to as "a pre-processor" or processor, can be used. FIG. 5 illustrates a pre-processor used in the context of a transmitter, consistent with an exemplary embodiment. The data source 502 may include a signal source 504 that provides data to a block such as forward error correction (FEC), cell mapping block, etc. The bits received from the signal source 504 over line 506 are then mapped to complex symbols (e.g., via Quadrature Amplitude Modulation (QAM)) by the forward error correction block 508. It is also possible that other symbols may be used including BPSK, QPSK, NUQ, NUC, or the like via modulation specific complex domain constellation mapping, for example. An OFDM carrier signal is the sum of a number of orthogonal sub-carriers, with baseband data on each sub-carrier being independently modulated using some type of phase/amplitude modulation scheme.

The data source 502 provides a sequence of ordered data values $(D_0, D_1, D_2 \ldots D_N)$ and provides or has assigned a corresponding sequence of ordered addresses $(A_0, A_1, A_2 \ldots A_N)$. The pre-processor 520 may include a plurality of processors coupled in series as shown in FIG. 4A. The first processor is coupled to the signal source 502 and the last processor is coupled to a memory (similar to memory 414 in FIG. 4A). Alternatively, all of the processors may be integrated into a single block such as block 450, which is coupled to memory 414, as shown in FIG. 4B.

Each processor in the pre-processor 520 is configured to pass the data values without a data modification. However, the addresses of the corresponding data values are modified (i.e., based on the function(s) to be implemented). Thus, the memory in the pre-processor 520 stores each data symbol from the last processor (or from a single processor) at a corresponding address of the memory, wherein the address is provided by the last processor. Put differently, the address provided by the last processor is an aggregate address that has been modified by several processors. Finally, the stored data is sequentially read from the memory such that the data reflects processing by the functions of the processing block(s).

The data can then be read out of the memory of the pre-processor 520 using the initial sequential address (e.g., $A_0, A_1, A_2$, etc.) This data is provided to an IFFT block 522, which converts the digital signals from frequency domain signals to time domain signals for transmission. The IFFT block 522 codes the data from pre-processor 520 to a plurality of frequency bins having a given bandwidth and each having a predetermined frequency and phase that may be transmitted directly. It should be noted that a transmitter converts from the frequency domain to the time domain whereas a receiver converts from the time domain to the frequency domain.

FIG. 6 illustrates a processor used in the context of a receiver, consistent with an exemplary embodiment. The pre-processing that is performed in the transmitter is reversed in the receiver to recover the data. The receiver includes a tuner 604, such as a radio frequency tuner (although the scope of the present invention is not limited to radio frequency operations), that feeds a sampler 608 to convert the analog radio frequency signal to a digital signal. The digital signal is transferred to an FFT processing block 604, which obtains frequency bin values that are output on a data line as a sequence of data values $D_0, D_1$, etc., and a sequence of addresses $A_0, A_1$, etc., on an address line. The data and addresses are provided to a processing block 620, which may include the processes as described herein. The processor 620 provides its output to a decoder 622 that obtains the original data, or as near to it as possible, which was provided to the transmitter. The processor 620 may be configured similar to processors 402 to 408 of FIG. 4A or 450 of FIG. 4B but perform the inverse operations.

Figure 7:
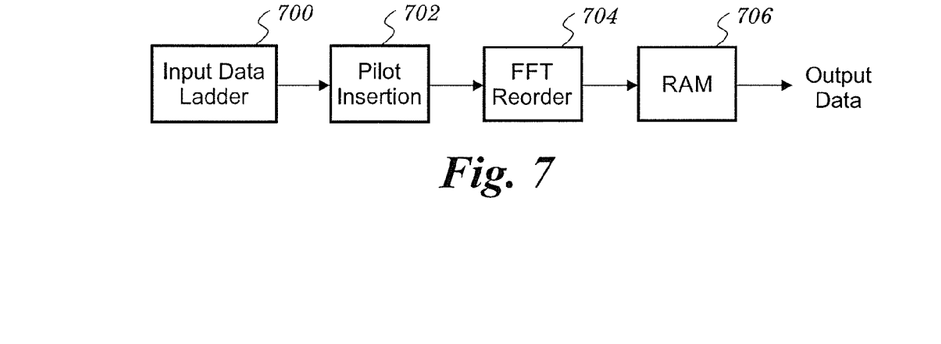
FIG. 7 is a functional block diagram of an example of a pilot insertion function with an FFT re-order function of an exemplary embodiment.

FIG. 7 shows an example of a pilot insertion process in a FFT reorder function. The illustrated example includes an input 700 that provides an input of data and addresses. The input data can be data from a data source or can be data from a prior processing block. The addresses can be addresses from the data source, addresses assigned to the data prior to processing, or addresses from a prior processing block. The pilot insertion process inserts pilot values (a, b, c, etc.) to frame each data value (A, B, C, etc.) with a pilot. The data values are input first, followed by the pilot values. In the example, the pilot insertion is performed on the addresses in block 702. The output of a pilot insertion process should be a pattern of pilot, data, pilot, data, pilot, data, etc. According to this example, the pilot is not inserted into the data as would occur in the prior art. Instead, the manipulated address information and the unmodified data is forwarded to another process block, here shown as an FFT reorder process 704. The FFT reorder process 704 performs its function on the manipulated addresses without modifying the data. The data is then written into the memory 706 according to the accumulated modified addresses. By reading the data out of the memory 706 in the order in which it is input to block 702, the data is formatted as if it had been processed by having a pilot signal inserted and then had been subject to an FFT reordering.

Figure 8:
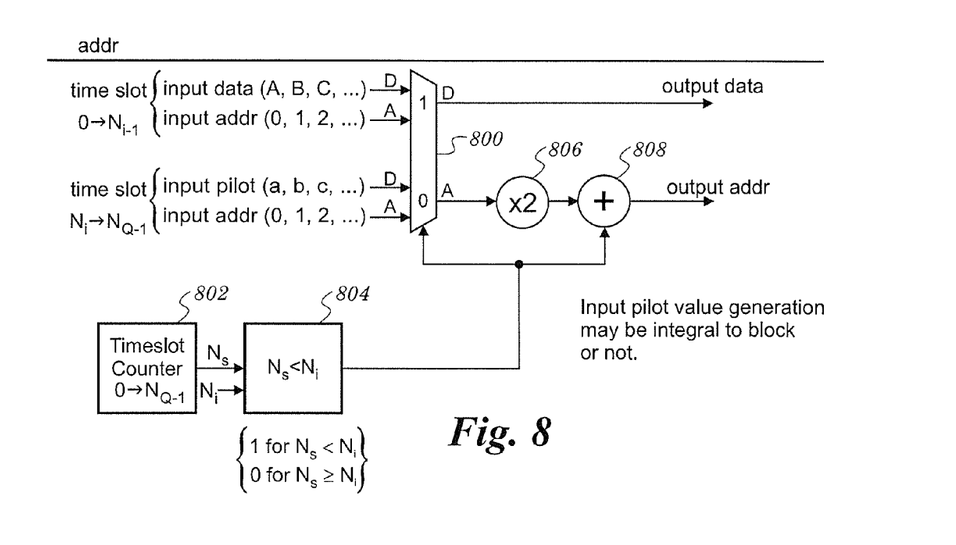
FIG. 8 is a schematic diagram of an example of a pilot insertion function.

FIG. 8 shows an example of a pilot insertion. In the example, the input data is A, B, C, D, E, F, G, H. The pilot data is a, b, c, d, e, f, g, h, i. The output data that is desired from the process is a, A, b, B, c, C, d, D, e, E, f, F, g, G, h, H, i. The example pilot insertion process provides the data as an output of A, B, C, D, E, F, G, H, a, b, c, d, e, f, g, h, i. The address stream output by the process is, 1, 3, 5, 7, 9, 11, 13, 15, 0, 2, 4, 6, 8, 10, 12, 14, 16. By writing the output data stream into the memory according to the address stream, the pilot signal is inserted as desired. The foregoing example is for an input of eight values or data units ($N_i$=8), which uses a pilot of nine units ($N_p$=9), and produces an output of seventeen units ($N_O$=17).

In the FIG. 8, for time slot 0 to $N_{i-1}$ the input data A, B, C, . . . is provided to the data input D of the multiplexer 800, while an input address string of 0, 1, 2, . . . is provided to an address input A. At a time slot $N_i$ to $N_{O-1}$, the pilot is input as a, b, c, . . . to the second data input $D_0$ and the address string of 0, 1, 2, . . . is input to the second address input $A_0$ of the multiplexer 800. A time slot counter 802 counts time slots from 0 to $N_{O-1}$, and provides an output $N_s$ to a magnitude comparison function which outputs a 1 or 0 depending on the relative values of $N_s$ and $N_i$, as shown. An input $N_i$ is provided at a second input of the function 804. The data output of the process 800 is unmodified (for example, the order of the data values has not been changed), but the address output is provided to a ×2 multiplier 806 and then to an adder 808. Both the multiplexer 800 and the adder 808 receive the output of the function 804 to provide the modified address.

Figure 9:
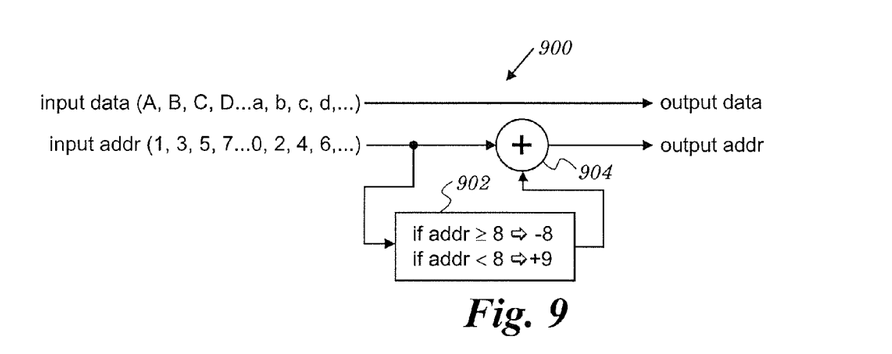
FIG. 9 is a schematic diagram of a re-order function.

FIG. 9 is an illustration of a sample FFT reorder process 900. An input data stream is provided and is passed along without modification. In this example the data is A, B, C, D, . . . , a, b, c, d, . . . , as received from the pilot insertion processor. The input address for the process 900 is received provided to an magnitude comparison function block 902 that determines if the address is equal to or above 8, a value of −8 is generated. If the address is less than 8, a value of +9 is generated. Note that the specific values used in this example depend on the values in the previous example ($N_i$, $N_p$, $N_O$). The output of the block 902 is provided to an adder 904 which adds either the −8 or +9 to the addresses of the address string. The resulting function is a reorder of data values to map to correct frequency bins at the FFT input. The first 8 values are lower frequency and the last 9 values are higher frequency. Typical FFT implementations require high bins first and low bins last. In an example, desired values from low frequency to high frequency are XYZQ. The value order required for the FFT is ZQXY, from first value to last value.

The processes are performed on the address values and leave the data values unmodified, or at least unmodified by the process, may be provided at either the write side, or input side, of the memory or at the read side, or output side, of the memory. In the examples presented so far, the modified addresses have been used to write the data into the memory. The modified addresses could also be used to read the data from the memory, for example by reading the data in the order specified in the addresses rather than reading it sequentially from the memory. In this case, the data values would be sequentially written into the memory. Some processes may work better at the output or read side of the memory than at the input side or write side of the memory. (Of course, side does not here indicate a physical side of the memory but only denotes the respective operation.)

Figure 10:
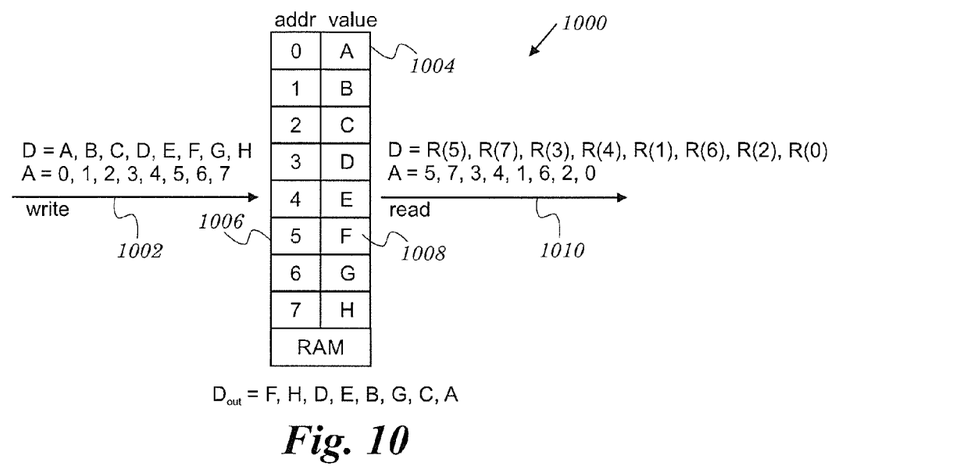
FIG. 10 is a schematic diagram of an interleave function performed post memory.

An example of a read side address process is an interleave process as shown in FIG. 10. The interleave is performed post-RAM (at the output of the memory), and may be considered a sequential write, random read (SWRR) operation. The function of the interleaver is to interleave data based on a pseudo-random number sequence PRNS, assigned the operator P in this example. The output data (i)=input data ($P_i$), where $P_i$ is the PRNS. In the illustrated example, the data input is A, B, C, D, E, F, G, H. The PRNS is 5, 7, 3, 4, 1, 6, 2, 0. The data is written to the memory sequentially, but is read out of the memory based on the addresses that have been generated by the pseudo random number generator. The application of the P function to the read function provides data D=R(5), R(7), R(3), R(4), R(1), R(6), R(2), R(0). The resulting data output string is $D_{out}$=F, H, D, E, B, G, C, A. The interleave function has thus been performed on data that was stored sequentially by use of modified addresses during the read operation.

Figure 11:
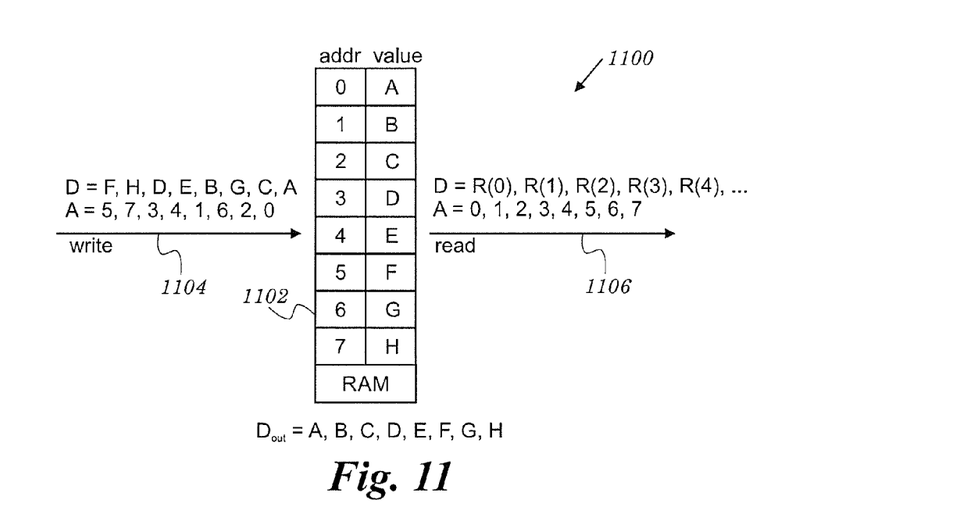
FIG. 11 is a schematic diagram of a de-interleave function performed pre memory.

FIG. 11 shows that a de-interleave process 1100 may be performed by modification of the addresses prior to writing the data to memory (pre-memory) using the modified addresses. This process may be termed a random write, sequential read process (RWSR). The de-interleave of data is based on a PRNS function (P). The input data $D_{in}$ has been interleaved using any interleave process, but may have been interleaved using the interleave process described in association with FIG. 10. In the illustrated example, the input data $D_{in}$=F, H, D, E, B, G, C, A and the address string for the input is $A_{in}$=5, 7, 3, 4, 1, 6, 2, 0. By writing the data into the memory 1102 using the modified address string, the stored data is ordered in the memory 1102 in a de-interleaved order. By reading the data from the memory 1102 sequentially, the data output from the memory 1102 is de-interleaved. In particular, by using the address string $A_{out}$=0, 1, 2, 3, 4, 5, 6, 7, the output data string $D_{out}$=R(0), R(1), R(2), R(3), R(4), R(5), R(6), R(7) is generated, de-interleaving the input interleaved data.

Figure 12A:
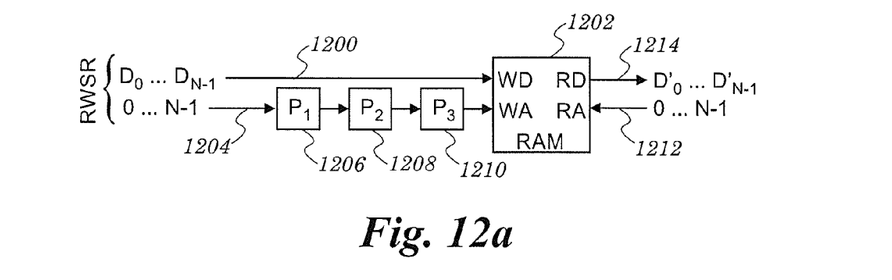
FIG. 12a is a functional block diagram of processing by address manipulation prior to a memory write operation.
Figure 12B:
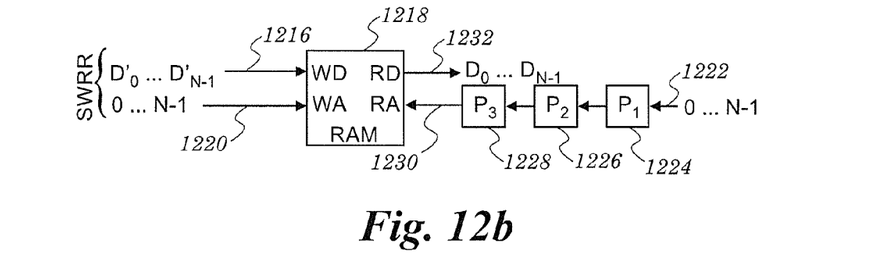
FIG. 12b is a functional block diagram of processing by address manipulation prior to a memory read operation.

Turning to FIGS. 12a and 12b, the principle of address manipulation aggregation may be applied to either the sequential write, random read (SWRR) operation or to the random write, sequential read (RWSR) operations. In FIG. 12a, the data 1200 is being input into the memory 1202 without modification according to the processes $P_{1-3}$ and the address string 1204 is modified by processes $P_1$ 1206, $P_2$ 1208, and P3 1210. The data 1200 is written into the memory 1202 using the accumulated modifications of the addresses. A sequential address string 1212 is used to read the data from the memory 1202 in the order stored, resulting in an output data string 1214 that has the data re-ordered as if the processes $P_1$ 1206, $P_2$ 1208, and P3 1210 had been prepared directly on the data. FIG. 12a is therefore a random write, sequential read (RWSR) operation, according to the meaning of the present application. As will be appreciated, the write operation is not truly random, but is the result of accumulated processes.

FIG. 12b shows the processes of a sequential write, random read (SWRR) operation wherein the processes $P_{1-3}$ are applied as the stored data is read out of a memory. In the illustration, a data string 1216 is provided to a write input of a memory 1218 and is written into the memory 1218 using an address string 1220. The address string 1220 writes the data into the memory in sequential order. An address string 1222 for reading the data from the memory 1218 is provided to a first process $P_1$ 1224 for manipulation of the addresses according to the process. The output of the first process $P_1$ 1224 is applied to an input of a second process $P_2$ 1226. The second process $P_2$ 1226 manipulates the address string in accordance with the second process. The second process $P_2$ 1226 provides the now twice manipulated address string to a third process $P_3$ 1228. The third process $P_3$ 1228 applies a further manipulation to the address string resulting in an accumulated address string 1230 that is used to read the stored data from the memory 1218. The resulting output data 1232 is in a form as if the processes $P_1$ 1224, $P_2$ 1226 and $P_3$ 1228 had been applied to the data. Although termed a random read operation, the reading of the data is not truly random, but instead is read using the accumulated manipulations of the addresses of the processes.

Figure 13:
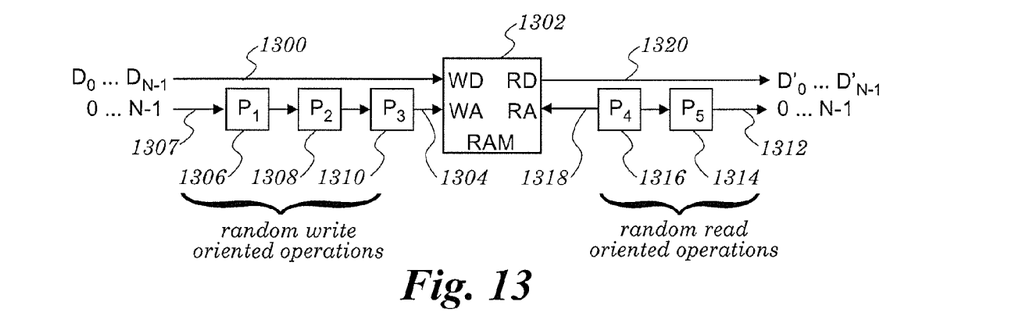
FIG. 13 is a functional block diagram of a processing using a combination of a memory write operation and a memory read operation.

As will be appreciated by those of skill in the art, the sequential write, random read (SWRR) operation and the random write, sequential read (RWSR) operation can be used together on a data string. In FIG. 13, a data string 1300 is provided to a write input of a memory 1302. The data string 1300 is written into the memory 1302 using a manipulated address string 1304 that is the accumulated result of applying a first process $P_1$ 1306 to an address string 1307, followed by a second process $P_2$ 1308 that receives the manipulated addresses of the first process $P_1$ 1306 and applies further processing. The second process $P_2$ 1308 provides the twice manipulated address to the third process $P_3$ 1310, which applies a manipulation to the address string that has the effect of applying its process to the data. The accumulated manipulations of the addresses by the three processes $P_{1-3}$ are used to write the data into the memory 1302.

Some processes may work better if applied on reading the data out of memory using manipulated address information than if applied on writing the data into memory. These processes, as well as others, may be used to read out the data that was previously stored in memory according to manipulated addresses in the write oriented operations. With reference to FIG. 13, the address string 1312 is provided to the process $P_5$ 1314 for address manipulation. The output of the address manipulation of the process $P_5$ 1314 is provided to the process $P_4$ 1316 for further manipulation. The accumulated address manipulations 1318 are provided at the read address input of the memory 1302, where the addresses are used to read out data stored in the memory according to the manipulated addresses to thereby generate a data sequence on the data output. The data order was manipulated by the write addresses during the write operation and is again manipulated by the read addresses during the read operation. The effect on the output data is that the data is in a form as if all of the processes $P_{1-5}$ had been applied directly to the data. The illustrated example therefore includes both write oriented operations, also termed random write (RW), and read oriented operations, also termed random read (RR), and so may be referred to as random write, random read (RWRR).

The illustrated process of FIG. 13 uses three processes for the write oriented operations and two processes for the read oriented operations. Any number of processes may be provided at the write side and at the read side. A single process that provides address manipulation as if a sequential accumulation of processes were performed may be used for either the write oriented operations or the read oriented operations, or both.

In an example of the embodiment of FIG. 13, the address string 1312 that is applied to the processes $P_4$ and $P_5$ is a sequential address string that has not been manipulated by a process. It is also foreseen that a manipulated address string may be supplied to the read oriented processes.

While the foregoing has described processing functions that are performed before the memory (e.g., RAM 414 in FIG. 4B) by way of non-limiting example, it will be understood that some processing functions are more appropriately implemented after the memory. For example, an interleave function is a sequential-write-random-read (SWRR) operation, while a de-interleave function is a random-write-sequential-read (RWSR) operation. Pre-memory processing includes address accompanying data while post-memory processing includes addresses to fetch data. Accordingly, the concepts discussed herein apply to both pre-memory (e.g., RWSR) and post-memory (e.g., SWRR) operations.

Thus, there is shown and described a pre-processing (and post-processing) apparatus and method that operates on address information and not on the data itself so that when the data is written into a memory according to the modified address information, the resulting data structure is as if the process has been performed on the data. Plural process blocks are provided in series that operate in turn on the address information without operating on the data to produce aggregate address information so that when the data is written into the memory according to the aggregate address information, the data is restructured according to the combined effects of the process blocks, while requiring only a single data memory for the series of processes. In a further embodiment, the plural processes are performed at once in a single process block that modifies the address information equivalent to an output address information of the aggregate of plural processes and the data is provided into the memory according to the aggregate address information.

The memory requirements are reduced by these improvements, reducing semiconductor area, power requirements, heating requirements, and costs for both transmitter end and receiver end devices.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently. For example, any signal discussed herein may be scaled, buffered, scaled and buffered, converted to another state (e.g., voltage, current, charge, time, etc.,), or converted to another state (e.g., from HIGH to LOW and LOW to HIGH) without materially changing the underlying control method. Accordingly, it is intended that the invention be limited only in terms of the appended claims.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for processing data, the system comprising:
   a signal source configured to provide a sequence of ordered data values and an address generator for generating a corresponding sequence of ordered addresses;
   a plurality of processors to perform predetermined functions and coupled in series having a first processor and a last processor, wherein the first processor is coupled to the signal source and each processor is configured to:
      pass the data values from the signal source or a previous processor without modification of the order of the data values; and
      modify the addresses from the signal source or the previous processor according to a predetermined processing function and output the modified addresses; and
   a memory coupled to the last processor, wherein the memory is configured to:
      store each data value from the last processor at a corresponding modified address of the memory provided by the last processor.

2. The system of claim 1, wherein the memory is configured to sequentially output each stored data value.

3. The system of claim 1, wherein the plurality of processors are configured to perform at least one of (i) frequency interleaving, (ii) pilot insertion, (iii) cell mapping, and (iv) Fast Fourier Transform (FFT) ordering.

4. The system of claim 1, wherein the memory is configured to output the stored data values in a sequence of ordered addresses.

5. The system of claim 1, wherein the memory is configured to output the stored data values in a sequence corresponding to modified addresses according to at least one function.

6. A system for processing a signal, the system comprising:
   a signal source configured to provide a sequence of ordered data values and a corresponding sequence of ordered addresses;
   a processor coupled to the signal source, wherein processor is configured to:
      pass the data values without modification of the order of the data values; and
      modify the addresses of the corresponding data values in accordance with at least two functions; and
   a memory coupled to the processor, wherein the memory is configured to:
      store the data value from the processor at the corresponding modified addresses of the memory provided by the processor according to at least two functions, the resulting stored data values in the memory being ordered as if the at least two functions had been cumulatively applied to the data.

7. The system of claim 6, wherein the memory is configured to output the data values sequentially in an order corresponding to the sequence of ordered values as stored in the memory.

8. The system of claim 6, wherein the processor is configured to perform at least two of (i) frequency interleaving, (ii) pilot insertion, (iii) cell mapping, and (iv) Fast Fourier Transform (FFT) ordering.

9. The system of claim 6, wherein the processor is configured to perform a modification of the sequence of ordered addresses that when used to write the ordered data values to a memory result in re-ordering the ordered data values according to at least two functions.

10. The system of claim 6, wherein the memory is configured to provide the data values in the sequence of ordered addresses.

11. A method of processing a signal, the method comprising:
    receiving a signal comprising a sequence of ordered data values and a corresponding sequence of ordered addresses;
    passing the data values through at least one processor without modification of the order of the data values;
    modifying the addresses of the corresponding data values by the at least one processor to produce modified addresses, the modified addresses corresponding to cumulative address changes of a plurality of data modification processes; and
    storing in a memory each data value from the at least one processor at a corresponding modified address of the modified addresses, the resulting stored data values in the memory being ordered as if the plurality of plurality of data modification processes had been cumulatively applied to the data.

12. The method of claim 11, further comprising: retrieving the data values sequentially from the memory in an order based on the received sequence of ordered addresses.

13. The method of claim 11, further comprising: retrieving the data values from the memory in an order determined by a modified sequence of addresses, wherein the modified sequence of addresses correspond to at least one function.

14. The method of claim 11, wherein the modifying step produces the modified addresses that correspond to performing at least one of the following functions: (i) frequency interleaving, (ii) pilot insertion, (iii) cell mapping, and (iv) Fast Fourier Transform (FFT) ordering when the data is stored in the memory according to the modified addresses.

15. The method of claim 14, wherein the storing of each data value from the at least one processor at a corresponding modified address of the memory has the effect of performing all of the functions of the at least one processor simultaneously.

16. The method of claim 11, wherein the modifying step produces the modified addresses that correspond to performing at least two functions.

17. The method as claimed in claim 11, wherein the step of modifying the addresses includes modifying the addresses in a plurality of sequentially connected processors.

18. A system for processing data, the system comprising:
   a signal source configured to provide a sequence of ordered data values;
   a plurality of processors to perform predetermined functions and coupled in series having a first processor and a last processor, wherein the first processor is coupled to the signal source and each processor is configured to:
      pass the data values from the signal source or a previous processor without modification of the order of the data values; and
      modify addresses of the data values according to a predetermined processing function and output the modified addresses; and
   a memory coupled to the last processor, wherein the memory is configured to one of:
      store each data value from the last processor at a corresponding modified address of the memory provided by the last processor, and
      read each data value from a corresponding modified address of the memory where the data values have been previously stored in the memory.

19. A method of processing a signal, the method comprising:
   receiving a signal comprising a sequence of ordered data values;
   passing the data values through at least one processor without modification of the order of the data values;
   modifying addresses of the corresponding data values by the at least one processor to produce modified addresses, the modified addresses corresponding to cumulative address changes of a plurality of data modification processes; and
   performing one of:
      storing in a memory each data value from the at least one processor at a corresponding modified address of the modified addresses, the resulting stored data values in the memory being ordered as if the plurality of plurality of data modification processes had been cumulatively applied to the data, and
      reading from a memory each data value at a corresponding modified address of the modified addresses, wherein the data values have been previously stored in the memory, upon being read out from the memory the data values being ordered as if the plurality of plurality of data modification processes had been cumulatively applied to the data.

20. A system for processing data, the system comprising:
   a plurality of processors to perform predetermined functions and coupled in series having a first processor and a last processor, wherein the first processor is operable to generate a sequence of first modified ordered addresses according to a function to be performed by the first processor when data is read from a memory using the a first modified ordered addresses;
   each subsequent processor of the plurality of processors receiving the modified ordered addresses of a preceding processor in the series, and each processor is configured to modify the addresses from the previous processor according to a predetermined processing function and output the modified addresses; and
   a memory in which data values to be processed are stored, the memory being coupled to the last processor in the series, wherein the memory is configured to output each data value from the memory according to a corresponding modified address provided by the last processor.

* * * * *